Nov. 15, 1966  E. D. JERNIGAN, JR  3,285,533
RENDEZVOUS AND DOCKING OF SPACE SHIPS
Filed June 10, 1963
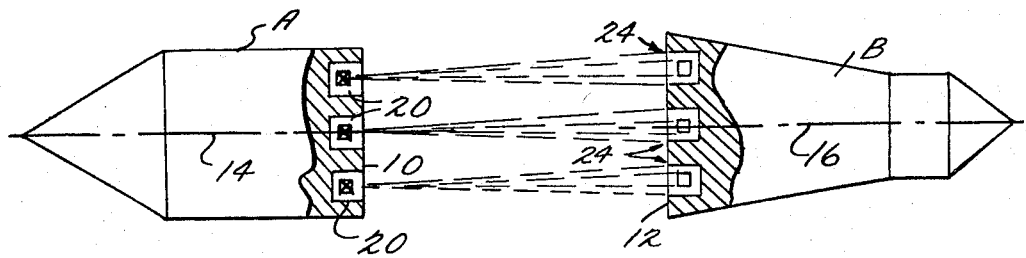
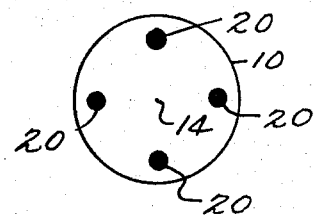
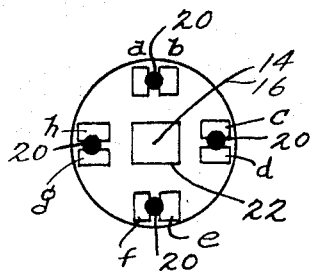
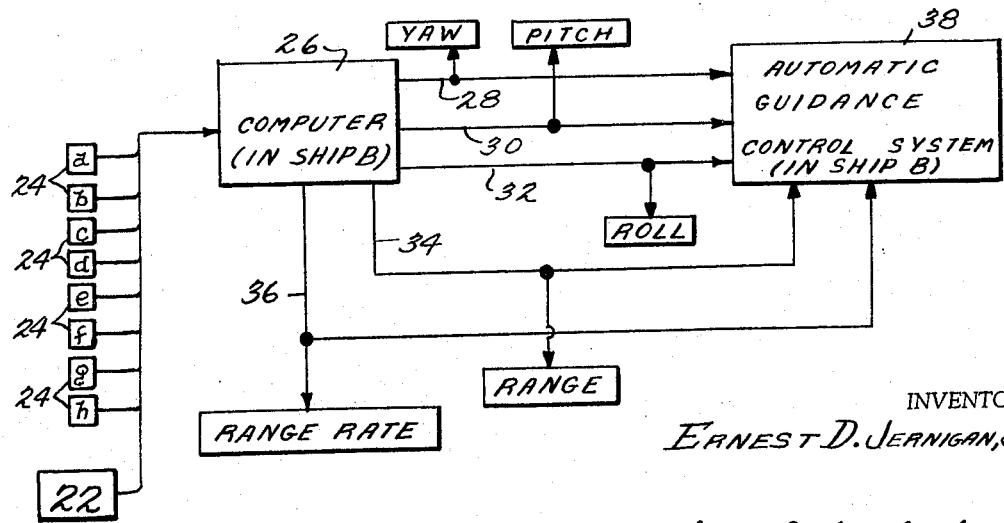
INVENTOR
ERNEST D. JERNIGAN, JR.
BY Cushman, Darby & Cushman
ATTORNEYS 3,285,533
RENDEZVOUS AND DOCKING OF SPACE SHIPS
Ernest D. Jernigan, Jr., Columbus, Ohio, assignor to Industrial Nucleonics Corporation, a corporation of Ohio
Filed June 10, 1963, Ser. No. 286,576
18 Claims. (Cl. 244—1)

This invention relates to a system and apparatus for aiding rendezvous and docking of space ships.

From day to day, the requirement for bringing space vehicles together is increasing. In many cases it has been found far more economical to launch several vehicles and/or parts of vehicles, generically referred to herein as "ships," into outer space and join them there rather than launch the entire complex from earth in one load. There is a further requirement for bringing together space ships for purposes of repair, supply, maintenance, change of crews, inspection, and the like. This invention enables any two generally close space ships to rendezvous, match their velocity and acceleration, establish the same altitude, and make the necessary docking couplings. Especially when the coupling devices are small or the coupling maneuver is preformed in the dark, coupling of the space ships together requires the very precise control and alignment which this invention provides.

Because of the potential importance of accomplishing rendezvous and docking, a considerable amount of study has been accomplished by many persons for the purpose of establishing the best way to effect rendezvous and docking of space ships. Visual aids and electromagnetic radiation have been proposed, and both pulsed and C.W. type radars have been investigated. Light radars, infrared devices, and the like have also been considered and could probably be quite useful. The present invention offers some advantages, however, over any other proposed system. Being based on nuclear radiation, the invention provides the considerable advantage of not requiring transmitting power. Additionally, it provides for a much greater accuracy at close distances. In fact, the closer the space ships come to each other the greater the accuracy provided by the system of this invention. On the other hand, most radar type systems become very inaccurate at short ranges. Furthermore, they are affected by glint, inherent pulse limitations, and the like.

It is therefore one of the primary objects of this invention to provide an aid to the rendezvousing and docking of space ships, using radioactive sources providing nuclear radiation beams from one of the ships and on the other ship using detectors which are sensitive to the respective radiation beams for delivering to a computer or the like signals from which can be determined any one of the various space relationships between the ships, for example yaw, pitch, roll, range and range rate. By measuring the rate at which the radiation products are being detected in the various detectors, the relative range, attitude, velocities and accelerations can be determined. Such information may be utilized by a person controlling the thrust and attitude of the space ships containing the detectors, or the information can be used by an automatic guidance control system in that ship.

Other objects and advantages of this invention will become apparent to those of ordinary skill in the art upon reading the appended claims and the following detailed description of the invention in conjunction with the drawing, in which:

FIGURE 1 diagrammatically represents two space ships with their docking ends facing each other in a rendezvous and docking maneuver;

FIGURE 2 diagrammatically illustrates the docking end of the one ship with the several radioactive sources;

FIGURE 3 diagrammatically illustrates the docking end of the other ship showing the several detectors and their relative dispositions;

FIGURE 4 diagrammatically illustrates how the sources of one ship and the detectors of the other are positioned relative to each other when the ships are coaxial and in the same attitude; and FIGURE 5 schematically illustrates the electronic system associated with the detectors for determining the various relative space relationships between the ships.

As above indicated this invention is based on the use of radioactive sources and their beams of radiation to effect the desired space relationships required to rendezvous or dock the ships. Since there is known to be a considerable amount of various types of radiation in outer space, it must be appreciated that in the present invention there is the required amount of discrimination between the desired type or types of radiation and that which is encountered in space. The worst problem would perhaps exist with the more intensive radiation in the Van Allen belt, but it is not very likely that rendezvous or docking will ever need to take place therein. Otherwise, radiation appears to come from the sun in the form of high energy protons, but this can be discriminated against on the basis of penetration. Furthermore, it will be appreciated from the following detailed description that the outputs of the detectors are compared on a statistical basis utilizing the difference in outputs as the quantity of value in determining the various space relationships. Therefore, background radiation from whatever source will generally be equal in all detectors the outputs of which are being compared. It is consequently apparent that by energy discrimination and detector design, no problem need exist in space in utilizing radiation from radioactive sources to aid rendezvous and docking of space ships.

In FIGURE 1, two space ships designated A and B are illustrated with their respective docking ends 10 and 12 facing each other. It will be appreciated that the "docking end" of any space ship need not be a true "end" thereof, but is that part of the ship which may be coupled to a docking part of another ship. The two ships illustrated have respective longitudinal center lines or axes 14 and 16, and it is about these two axes that the radioactive sources and detectors are disposed, symmetrically as shown. As is diagrammatically indicated in FIGURE 2, four radioactive sources 20 are circumferentially spaced 90° apart in the docking end 10 of ship A at equal radii from axis 14. The sources 20 are otherwise designated Nos. 1, 2, 3 and 4.

Reference is now made to FIGURE 3 which illustrates a face view of the docking end 12 of the other ship B. Preferably centered on its axis 16 is a detector 22, which, as described below, cooperates with all the sources 20 to provide a range and range rate indication. Also disposed in the docking end 12 of ship B are four detector pairs 24. The detectors in each pair are circumferentially spaced in a relatively small sector angle on a circumference which as may be noted by FIGURE 4 has a radius approximately equal to the radius for the sources 20. The upper detector pair 24 in FIGURE 3 includes the separate detectors $a$ and $b$, while the detectors next situated in a clockwise direction are respectively designated $c, d, e, f, g$ and $h$.

As shown in FIGURE 4, when the two ships are coaxial and have the same degree of roll, i.e., their attitude is the same, the detectors in each pair are symmetrically disposed relative to their respective sources. That is, detectors $a$ and $b$ are symmetrical relative to source No. 1, detectors $c$ and $d$ are symmetrical relative to source No. 2, detectors $e$ and $f$ are symmetrical relative to source No. 3, and detectors $g$ and $h$ are symmetrical relative to source No. 4. Their symmetrical relation to their respective sources means that when the two ships are coaxial and at the same attitude, the detectors in each pair will be equidistant from their respective radiation source. Accordingly, each detector in the pair will then provide the same output.

Before proceeding, it should be noted, as is evident from FIGURE 1, that each of the sources is partially shielded in accordance with known practices, to cause its radiation to be generally in the form of a narrow beam. In this manner all of the radiation sources 20 provide discrete beams of radiation. In like manner, the detectors in each detector pair 24 are also partially shielded or collimated so as to receive the radiation beams respectively when the ships are properly oriented. That is, detectors $a$ and $b$ are closely spaced apart so as to be associated with only source No. 1 when the ships are coaxial and of the same attitude or degee of roll. Similarly, under such circumstances, detectors $c$ and $d$ are associated only with source No. 2, detectors $e$ and $f$ only with source No. 3, and detectors $g$ and $h$ only with source No. 4. Detector 22, on the other hand, is not substantially shielded or collimated, and consequently it may have practically a 180° field of view and therefore sensitive to radiation from sources 20. If necessary, when only detector 22 and not detectors 24 are being used to determine range and range rate as described below, the shielding on sources 20 may be retracted as desired to spread the radiation beams Alternatively, sources 20 may be completely closed off and another source (not shown) which has a wide field emanating from axis 14 on docking end 10 of ship A may be employed at such times.

FIGURE 5 illustrates the electronics which may be housed in ship B for providing an indication and/or automatic guidance of ship B relative to ship A during a rendevous and docking procedure. Each of the detectors $a-h$ and the range and range rate detector 22 are connected to a computer 26 which provides signals on output line 28 that indicate the yaw space relationship between the ships, signals on line 30 to indicate the pitch relationship therebetween, signals on line 32 to indicate the roll relationship therebetween, and signals on lines 34 and 36 to indicate the range and range rate relationship therebetween. These signals may be displayed on appropriate meters as illustrated for pilot guidance, and/or applied to an automatic guidance control ssytem 38 as error corrective signals which effect desired servo signals for causing the ships to become coaxial at the same attitude for docking purposes.

Computer 26 operates on all of the signals simultaneously to effect whatever mutual compensations are necessary. Considering the two space ships only from a yaw standpoint for a moment, it will be apparent that one of the horizontally disposed detector pairs, $c$, $d$ and $g$, $h$ will receive more radiation from sources Nos. 2 and 4 than will the other detector pair. Assuming that all sources are of equal strength and all detectors efficient, which circumstances would naturally be effectively provided for by known compensation methods, then the count rate or output of detectors $c$ and $d$ will differ from the count rate of detectors $g$ and $h$ as a function of the yaw angle between the two ships and the signal on the computer output line 28 will signify this difference.

Similarly, if the ships differ only in pitch, then the count rate or outputs of detectors $a$ and $b$ will differ from the count rate of detectors $e$ and $f$ as a function of the pitch angle and computer output line 30 will carry a signal indicating that difference.

If one of the ships is at a different degree of roll than another, as would be the situation if one of the ships began to roll before coupling of the ships occurs, then the differential count rate from the detectors in each pair is a measure of the amount of roll. For example, if ship A rolls clockwise relative to ship B, then the count rate from source No. 1 in detector $a$ will be less than in detector $b$. A similar effect will occur in the other detector pairs, for the count rate or output of detector $c$ will be less than that of its paired $d$ from source No. 2, the output from detector $e$ will be less than that from detector $f$ as to source No. 3, and the output of detector $g$ will be less than that of $h$ as to source No. 4. Under these circumstances, the signal on computer line 32 will signify the difference in count rate by the detectors in each pair as a function of relative roll.

Additionally, computer 26 will consider the output from the separate large detector 22 which has a less restrictive field of view, and will determine the range and range rate based on the total count and time rate of change of the total count from all sources 20. Range and range rate signals from the computer may be displayed as indicated and provided as necessary to the automatic guidance control system 38.

It has above been indicated that the present invention finds its greatest use in a relatively short range situation where radar or the like cannot be of much help. For example, when there is only a 15-foot difference between ships, radar becomes uselessly inaccurate. It is in situations of this sort, though the invention is not limited to operation under 15 feet distances, where this invention can effect its greatest assistance. It will be appreciated that the invention applies more to an assist in docking than in general rendezvous, for radioactive sources are limited, perhaps to 2,000 feet or so, in their distance coverage ability. Generally, it will be possible for the pilot of space ship B to rendezvous the ships sufficiently to effect at least a rough alignment. For example, periscopes and radars may be useable to bring the ships into sufficient alignment for operation under the present invention whereby the pilot can control ship B in accordance with the indications on the yaw, pitch, etc., meters illustrated in FIGURE 5. If other means cannot be utilized to place the two ships close to the same degree of roll, then some means must be made available for identifying at least one of the sources 20 by its type of radiation. This can readily be accomplished, for example, by making source No. 1 a substantially higher energy gamma ray source than the Nos. 2, 3 and 4 gamma sources, and by providing detectors $a$ and $b$ with a conventional type of energy discriminator means whereby these detectors are responsive only to the higher energy radiation. Many other combinations of the basic "key source" arrangement will be readily visualized by one skilled in the art, such as the use of a beta ray key source in combination with the three gamma ray sources. Under such circumstances, the pilot or automatic guidance system will effect a roll maneuver of ship B until all of the detectors $a-h$ indicate receipt of their respective beams of radiation, and then the roll maneuver is perfected until each of the detectors in each pair respectively receive equal amounts of radiation from their respective source.

It is therefore apparent that this invention has provided for all of the objects and advantages herein mentioned. Other objects and advantages, and even modifications of the invention, will become apparent to one of ordinary skill in the art upon reading this disclosure, but it is to be understood that this disclosure is to be considered exemplary and not limitative, the scope of the invention being defined by the appended claims.

What is claimed is:

1. In apparatus for determining the space relationships of two space ships or the like comprising at least four nucleonic sources of beam radiation spaced substantially diametrically opposite both vertically and horizontally on one of said ships for directing four discrete beams of radiation outwardly from the docking end of said one ship, four detector means disposed on the other ship substantially diametrically opposite both vertically and horizontally, and means responsive to the outputs of said detector means for determining the pitch and yaw relationship between said ships.

2. In apparatus for aiding rendezvous and docking of two space ships or the like, the improvement comprising a plurality of nucleonic sources of beam radiation disposed on one of said ships in a predetermined angularly spaced relationship for directing discrete beams of radiation outwardly from the docking end of said one ship, a like plurality of pairs of detectors of said radiation, said detector pairs being respectively associated with said sources and disposed at the docking end of the other ship in the same said predetermined angularly spaced relationship as said sources, the detectors in each pair being symmetrical as to the respective beam of radiation when said ships are coaxial and at the same degree of roll, different detector pairs beings disposed at different angles in a plane normal to the axis of the said other ship, and means responsive to the outputs of said detectors for determining space relationships between said ships including roll and at least one of the relationships yaw and pitch.

3. Apparatus as in claim 2 wherein said determining means includes an automatic control system for guiding said other ship in accordance with the said determined space relationships.

4. Apparatus as in claim 2 and further including a further source of nucleonic radiation on said one ship and a further detector on the other ship for sensing radiation from said further source, and means responsive to the output of said further detector for determining the range between said ships.

5. Apparatus as in claim 4 and further including a further source of nucleonic radiation on said one ship and means responsive to the output of said further detector for determining the rate of range change between the said ships.

6. Apparatus as in claim 2 wherein at least one of said sources provides a different type radiation than another and their respectively associated detector pairs are insensitive to the radiation from the other of said one and another sources.

7. In apparatus for determining space relationships between two spaced devices, the improvement comprising:
at least one nucleonic source of beam radiation disposed on one of said devices at a substantial predetermined first radial distance from the axis of said one device for directing a narrow beam of radiation outwardly from one end of said one device in the general direction of said axis,
at least one pair of spaced detectors sensitive to said radiation and disposed on one end of the other device radially from the axis thereof at a distance substantially equal to said first radial distance in a predetermined relationship relative to said other device for providing respective outputs indicating the amounts of said beam being received, and
means responsive to the said detector outputs for determining the relative degree of rotation of said devices about said axes.

8. In apparatus for determining space relationships between two spaced devices, the improvement comprising:
at least one nucleonic source of beam radiation disposed on one of said devices at a substantial predetermined first radial distance from the axis of said one device for directing a beam of radiation outwardly from one end of said one device,
at least one pair of spaced detectors sensitive to said radiation and disposed on one end of the other device radially from the axis thereof at a distance substantially equal to said first radial distance in a predetermined relationship relative to said other device for providing respective outputs indicating the amounts of said beam being received,
means responsive to the said detector outputs for determining the relative angular rotation of said devices about said axes, and
means in said other device responsive to said determining means for automatically correlating the degree of angular relationship of the two devices.

9. In apparatus for determining space relationships between two spaced devices, the improvement comprising:
first and second nucleonic sources of beam radiation radially disposed on one of said devices for directing respective beams of radiation outwardly from one end of said one device,
a pair of spaced detectors sensitive to one of said radiations beams and radially disposed on the other device in a predetermined relationship relative to said other device for providing respective outputs indicating the amounts of said one beam being received,
detector means sensitive to the other of said radiation beams and disposed on the said other device at a substantial angle from said pair of detectors for providing an output indicating the amount of said other beam being received, and
means responsive to the said outputs of said pair of detectors and detector means for determining the relative angular rotation of said devices about respective axes and the oblique angle between said axes in at least one direction.

10. In apparatus for determining space relationships between two spaced devices, the improvement comprising:
first and second nucleonic sources of beam radiation radially disposed substantially 180° apart on one of said devices for directing respective beams of radiation outwardly from one end of said one device,
a pair of spaced detectors sensitive to one of said radiation beams and radially disposed on the other device in a predetermined relationship relative to said other device for providing respective outputs indicating the amounts of said one beam being received,
detector means sensitive to the other of said radiation beams and disposed on the said other device for providing an output indicating the amount of said other beam being received, and
means responsive to the said outputs of said pair of detectors and detector means for determining the relative angular rotation of said devices about respective axes and the oblique angle between said axes in at least one direction.

11. In apparatus for determining spatial relationships between two spaced devices, the improvement comprising:
first, second, third and fourth nucleonic sources of beam radiation radially disposed on one end of one of said devices substantially 90° apart for directing discrete beams of radiation from the said one end of one said device,
first, second, third and fourth detector means respectively sensitively to said beams and radially disposed substantially 90° apart on one end of the other device,
at least one of said detector means being a pair of detectors closely spaced apart at an angle substantially less than 90°, and
means responsive to the outputs of said detectors and detector means for determining the relative degree of rotation of said devices about respective axes and the oblique angles therebetween in mutually perpendicular directions.

12. In apparatus for determining relationships between two spaced devices, the improvement comprising:
first, second, third and fourth nucleonic sources of beam radiation disposed substantially at the same predetermined radial distance from the axis of one of said devices and on one end thereof at substantially 90° apart for directing discrete beams of radiation from the said one end of one said device, first, second, third and fourth detector means respectively sensitive to said beams and radially disposed substantially 90° apart on one end of the other device, each of said detector means comprising a respective pair of detectors closely spaced apart circumferentially on a radius of approximately said predetermined radial distance, and means responsive to the outputs of said detectors for determining the relative degree of rotation of said devices about respective axes and the oblique angles therebetween in mutually perpendicular directions.

13. In apparatus for determining relationships between two spaced devices, the improvement comprising:

first, second, third and fourth nucleonic sources of beam radiation radially disposed on one end of one of said devices substantially 90° apart for directing discrete beams of radiation from the said one end of one said device, first, second, third and fourth detector means respectively sensitive to said beams and radially disposed substantially 90° apart on one end of the other device, one of said sources being of a different radiation type than the others and the corresponding detector means being insensitive to the other type radiation for purposes of assisting in at least initial orientation of the relationship of said devices, and means responsive to the outputs of said detector means for determining relative angular relationships between predetermined axes of said devices.

14. In apparatus for determining relationships between two spaced devices relatively movable toward or away from each other, the improvement comprising:

first, second, third and fourth nucleonic sources of beam radiation radially disposed on one end of one of said devices substantially 90° apart for directing discrete beams of radiation from the said one end of one said device, first, second, third and fourth detector means respectively sensitive to said beams and radially disposed substantially 90° apart on one end of the other device, means responsive to the outputs of said detector means for determining relative angular relationships between predetermined axes of said devices, and means on said two devices for determining range and range rate thereof.

15. In apparatus for determining the relationships between two spaced devices, the improvement comprising:

at least one nucleonic source of beam radiation disposed on one of said devices at a substantial predetermined radial distance from the axis of said one device for directing a narrow beam of radiation outwardly from one end of said one device, a pair of spaced detectors sensitive to said radiation disposed on one end of the other device both substantially at said given radial distance from the axis of said other device at a sector angle the bisect of which is substantially at the same angular relationship relative to said other device as said source to said one device so that said detectors are equidistant from said one source when said devices are coaxial and at the same rotation angle, and means, including means responsive to the outputs of said detectors, for determining the relative degree of rotation of said devices about said axes.

16. Apparatus as in claim 1 wherein at least one of said detector means includes two detectors arcuately spaced apart close enough to simultaneously detect radiation from one of said beam sources, and said detector output responsive means includes means responsive to the outputs of said two detectors for determining the relative degree of roll between said ships.

17. Flight control apparatus, comprising:

a first spacecraft in flight;

a second maneuverable spacecraft in flight to be maneuvered with respect to said first spacecraft;

means emitting nuclear radiation positioned on one or the other of said spacecraft;

nuclear radiation detector means positioned on the other of said spacecraft and responsive to said radiation for providing a signal indicative of the roll, pitch yaw and range of said one spacecraft with respect to said other spacecraft; and means responsive to said position signal for controlling the yaw, pitch, roll and range of said maneuverable spacecraft relative to said first spacecraft.

18. Flight control apparatus, comprising:

a first spacecraft in flight;

a second spacecraft maneuverable with respect to said first spacecraft;

nuclear radiation means positioned on one or the other of said spacecraft to direct a plurality of beams of radiation outwardly therefrom;

nuclear radiation detector means positioned on the other of said spacecraft responsive to said beams of radiation for continuously providing a signal indicative of the roll, pitch, yaw, and range of said first spacecraft with respect to said second spacecraft; and means responsive to said signal for controlling the roll, pitch, yaw and range of said maneuverable spacecraft relative to said first spacecraft.

References Cited by the Examiner

UNITED STATES PATENTS 2,662,208 12/1953 Wells _____ 250—106
3,167,652 1/1965 Weisbrich _____ 250—106

OTHER REFERENCES

Article titled "Satrac—Space Rendezvous Systems" by L. J. Kamm, Astronautics, June 1961, pp. 32, 33, 44 and 46.

FERGUS S. MIDDLETON, *Primary Examiner.*

B. A. BORCHELT, *Examiner.*

L. L. HALLACHER, G. P. EDGELL,
*Assistant Examiners.*

UNITED STATES PATENT OFFICE
CERTIFICATE OF CORRECTION

Patent No. 3,285,533              Dated  March 10, 1970

Inventor(s) E. D. Jernigan, Jr.

It is certified that error appears in the above-identified patent and that said Letters Patent are hereby corrected as shown below:

Column 1, line 53, "any one" should read ---anyone---.
Column 3, line 28, "beams  Alternatively," should read ---beams.  Alternatively,---; column 3, line 46, "ssytem" should read ---system---.
Column 4, line 4, "paired d" should read ---paired detector d---.
Column 7, line 60, "device," should read ---devices,---.
Column 8, line 26, "pitch" should read ---pitch,---.

SIGNED AND
SEALED
JUL 28 1970

(SEAL)
Attest:

Edward M. Fletcher, Jr.
Attesting Officer

WILLIAM E. SCHUYLER, JR.
Commissioner of Patents